United States Patent [19]
McGowan

[11] 3,761,924
[45] Sept. 25, 1973

[54] ISOLIMITER

[75] Inventor: Joseph W. McGowan, Spring Lake Hgts., N.J.

[73] Assignee: The United States of America as represented by the Secretary of the Army

[22] Filed: Sept. 14, 1972

[21] Appl. No.: 289,020

[52] U.S. Cl. ............................... 343/5 R, 333/24.2
[51] Int. Cl. ......................... G01s 9/02, H01p 1/32
[58] Field of Search .................... 333/24.2; 343/5 R

[56] References Cited
UNITED STATES PATENTS

| | | | |
|---|---|---|---|
| 3,051,908 | 8/1962 | Anderson et al. | 333/24.2 |
| 3,676,803 | 7/1972 | Simmons | 333/24.2 |
| 3,197,718 | 7/1965 | Sigrist et al. | 333/24.2 |
| 3,188,636 | 6/1965 | Seppen | 343/5 R X |
| 2,818,501 | 12/1957 | Stavis | 343/5 R |

*Primary Examiner*—Malcolm F. Hubler
*Attorney*—Harry M. Saragovitz et al.

[57] ABSTRACT

A ferrite isolator is combined with a ferrite-varactor limiter waveguide section to absorb reflected power without affecting microwave power signals incident to the ferrite limiter. A single magnet biases the ferrite limiter to subsidiary resonance and the ferrite isolator to main resonance. The combined isolator-limiter or isolimiter is used in a dual antenna radar system having a switched four-port circulator so that a signal from the transmitter is directed by the circulator to the selected one of the two antennas and radiated signal energy that is reflected back from the selected antenna is directed by the circulator through the isolimiter to the receiver where any spikes reflected by the varactor-limiter are absorbed by the isolator whereby varactor reflected spikes do not reach the other of the two antennas. The isolimiter affords receiver protection and isolation in one unit no larger than the limiter.

3 Claims, 4 Drawing Figures

Patented Sept. 25, 1973

ISOLIMITER

BACKGROUND OF THE INVENTION

A known method of protecting a sensitive radar receiver has been to include in the waveguide a limiter section near the receiver input. The limiter section includes a gas TR or plasma stage and a varactor stage. The plasma stage operates to reduce incident RF power to a level that can be safely limited by the varactor stage. The varactor cannot be used alone because of its limited power handling capacity and catastrophic failure mechanism. The plasma stage does not react instantaneously. Therefore the leading edge of each incident power pulse passes through the plasma stage in the form of a spike leakage pulse. The major portion of the power incident on the varactor is the spike leakage pulse. Because the spike leakage is so short, viz. 30 nanoseconds, the spike leakage energy is sufficiently low not to damage the varactor. The fast response time of the varactor makes it ideal for blocking the spike leakage from the receiver.

The varactor-limiter is a junction diode that exhibits a voltage dependent capacitance that can be varied from a lower limit on the order of 10 picofarads up to infinity, depending on the incident voltage. The varactor has an extremely fast reaction time and its recovery time is less than 10 nanoseconds.

There has been recent development work directed to replacing plasma-varactor limiters with ferrite-varactor limiters. The expected advantages include doing away with the problem of gas cleanup, taking advantage of ferrite rapid recovery time which is in nanoseconds as compared to microseconds for plasma, very much longer shelf life, and much smaller handling problems. It is known that it is advantageous to operate a ferrite limiter at subsidiary resonance. In subsidiary resonance limiting, the magnetic biasing field is of substantially less intensity than that required for main gyromagnetic resonance. Subsidiary resonance limiting also offers increase in operating band and increase in power capacity but is characterized by higher threshold level. With the exception of high power spikes about 30 nanoseconds wide corresponding to the leading edges of each incoming signal pulse and equal to the input power of the respective incoming pulses, subsidiary resonance limiting absorbs all signal power above a certain critical level of microwave field intensity within a wider frequency band than is served by main resonance limiting. Signal pulse leakage through the ferrite limiter includes flat leakage of a certain threshold level following each spike. The spike leakage results from the finite time required to generate the spin waves that perform the limiting function. Flat leakage is that part of the incoming pulse not attenuated by spin-wave absorption. The varactor limiter performs its limiting function by reflecting all the microwave power incident thereto and in excess of a certain limiting threshold, characteristic of the varactor. The reflected spikes pass back through the ferrite limiter. When operating at sufficiently high power, the reflected spikes produce very high VSWR.

SUMMARY OF THE INVENTION

In a ferrite-varactor limiter waveguide section a separate slab of ferrite isolator is added in the same waveguide section and is substantially coextensive with the ferrite-varactor limiter and is centered relative to the plane of circular polarization. The slab of ferrite isolator is essentially transparent to signal energy propagated toward the receiver but absorbs energy reflected by the varactor. The same magnet that biases the ferrite limiter for subsidiary resonance also biases the additional slab of ferrite to main resonance for absorbing the spikes reflected by the varactor limiter. Absorption of the spike power does not change the temperature of the ferrite isolator slab significantly because the energy in the spikes is so low and because the isolator slab radiating surface is ample.

DESCRIPTION OF THE PREFERRED EMBODIMENT

Figure 1:
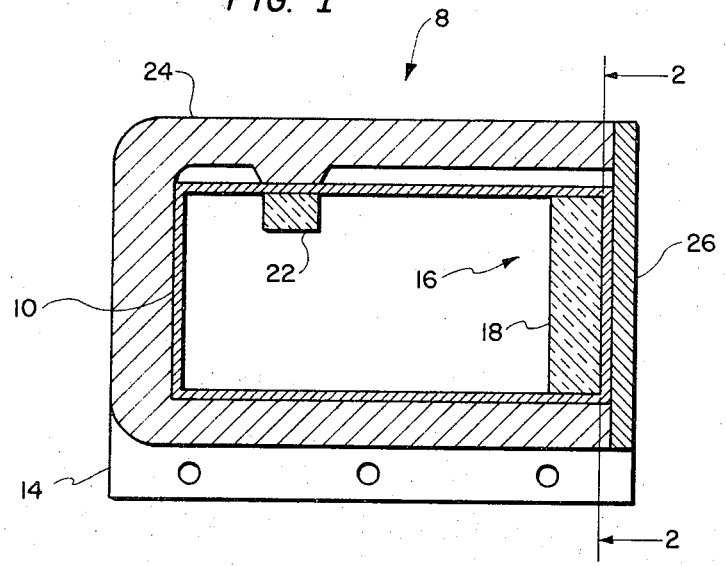
FIG. 1 is a transverse section of an isolimiter according to this invention.
Figure 2:
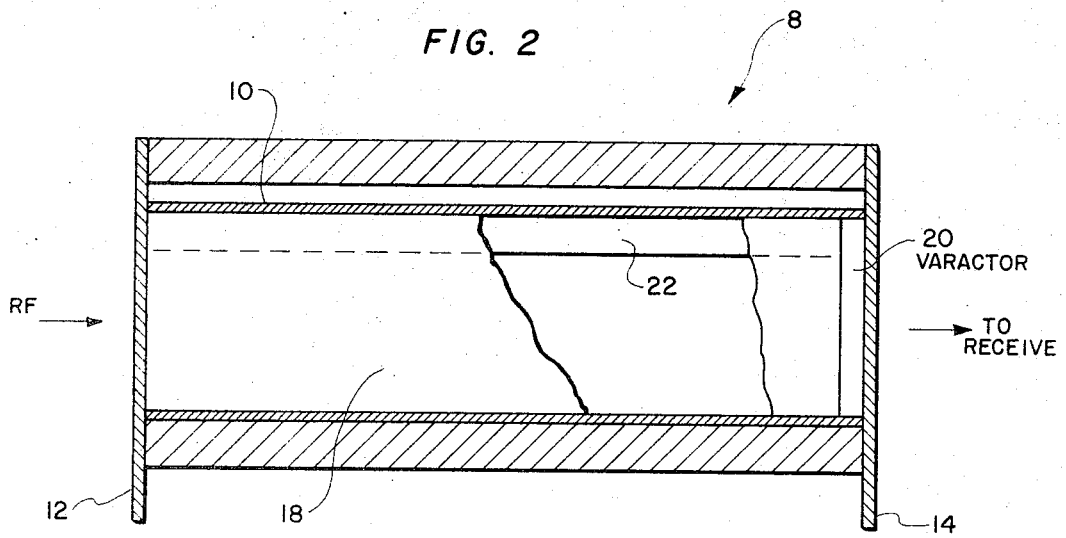
FIG. 2 is a longitudinal section taken on line 2—2 of FIG. 1 wherein the conventional varactor limiter is shown as a block.

In FIGS. 1 and 2 there is shown an isolimiter 8 according to this invention including a waveguide section 10 with conventional coupling flanges 12 and 14 at its ends. A ferrite-varactor limiter 16 of substantially the same length as the waveguide section and the same width as the inside of a narrow wall of the waveguide 10 is cemented to the inside of the waveguide against one of the narrow walls. The ferrite-varactor limiter 16 includes a slab of ferrite 18 terminated at one end by a varactor 20. A separate slab of ferrite 22 is affixed to the inner surface of one of the broad walls of the waveguide. The ferrite slab 22 is parallel to and substantially coextensive with the ferrite slab 18 and extends a minor fraction of the distance between the broad walls of the waveguide. The ferrite slab 22 is centered relative to the plane of circular polarization which is about one-quarter the distance across the waveguide from the narrow wall opposite the ferrite limiter. The energy to be absorbed is very small compared to the energy attenuation required of ferrite slab 18.

The ferrite slab 18 is operated at subsidiary resonance which is about 0.7 of main resonance and the ferrite slab 22 is operated at main resonance. A common magnetic means is used for both ferrites. The magnetic means shown is an essentially U-shaped permanent magnet 24 that fits around the waveguide section between the flanges 12, 14. The bight of the U-shaped magnet abuts the narrow wall of the waveguide section opposite the limiter 16. A magnetic shunt 26 is secured to the free ends of the legs of the U-shaped magnet. The spacing between the legs of the magnet exceeds the narrow dimension of the waveguide section and one leg has a projection that extends longitudinally and is located so as to be adjacent the ferrite slab 22. The magnet and shunt combination are designed to provide the magnetic bias to the ferrite slab 16 for operating at subsidiary resonance and to the isolator 22 for operating at main resonance.

The varactor end of the waveguide section 10 is coupled to a receiver; RF is delivered to its opposite end.

Figure 3:
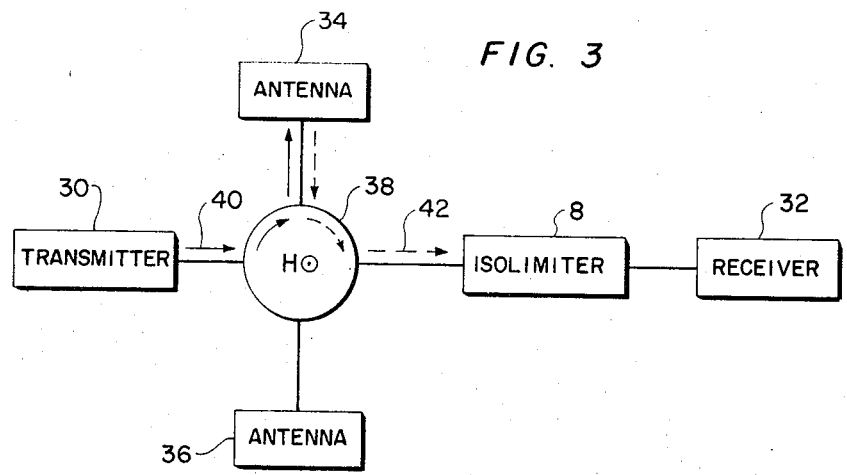
FIGS. 3 and 4 are block diagrams of the one radar system under different operating conditions.
Figure 4:
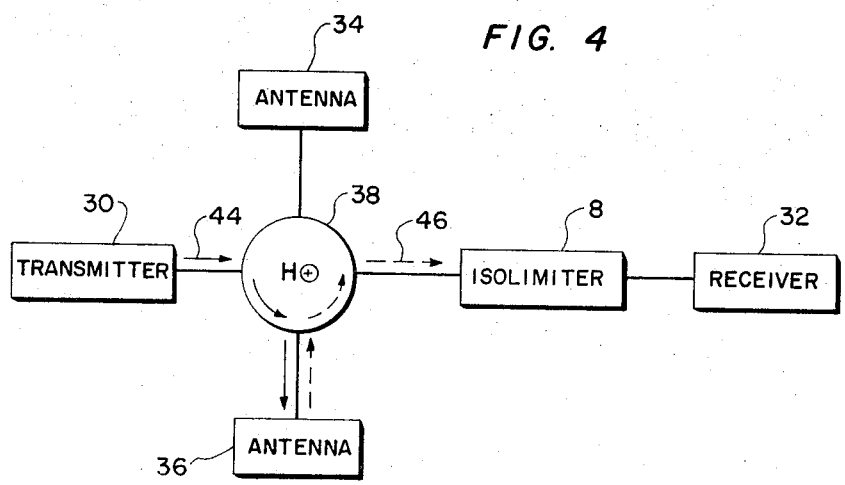

The radar system shown in FIGS. 3 and 4 includes a transmitter 30, receiver 32, and two antennas 34, 36 having different directivities, beam patterns, etc., all coupled to a four-port circulator 38. An isolimiter 8 as shown in FIGS. 1 and 2 is included in the waveguide between receiver 32 and circulator 38. FIGS. 3 and 4 differ in that the circulator is magnetically biased oppositely, indicated by H⊙ in FIG. 3 for activating one of the antennas and H⊕ in FIG. 4 for activating the other of the antennas. In FIG. 3, signal power 40 from transmitter 30 is directed by circulator 38 to antenna 34 and reflections 42 of the signal power radiated by antenna 34 are directed by the circulator to receiver 32; in FIG. 4, signal power from transmitter 30 is directed by circulator 38 to antenna 36 and reflections 46 of the signal power radiated by antenna 36 are directed by the circulator to receiver 32.

The isolator ferrite 22 is essentially transparent to signal energy propagated from the circulator toward the receiver but absorbs signal energy propagated in the reverse direction. Spike pulses reflected or returned by the varactor 20 are absorbed in the isolator. Were the spike pulses not absorbed they would be directed by the circulator to the other antenna, and radiated. Some of the unwanted energy radiated by the second antenna would be sensed by the first or active antenna causing spurious indications at the receiver.

The isolimiter is the same length as the original ferrite-varactor limiter. The difference in magnet design may result in minor weight difference. There is no need for a separate isolator. Modification of an existing system by replacing the limiter waveguide section with an isolimiter waveguide section according to this invention is carried out simply and at minimal cost.

What is claimed is:

1. A protection device for a receiver of a radar system comprising
    a waveguide section including a ferrite limiter,
    a varactor limiter supported at the receiver end of the ferrite limiter,
    a ferrite isolator supported in the waveguide parallel to the ferrite limiter and in the region of circular polarization,
    said ferrite isolator and said ferrite limiter being substantially coextensive, and
    means for providing magnetic bias to said ferrite limiter and to said ferrite isolator.

2. A protection device for a receiver of a radar system as defined in claim 1 wherein said means for providing magnetic bias is a single magnet and a magnetic shunt that provides the field intensity across said ferrite limiter for secondary resonance limiting and the field intensity across said isolator for main resonance.

3. In a radar system the combination which comprises
    a four port circulator,
    two antennas coupled to two of the ports of the circulator,
    a transmitter coupled to a third port of the circulator,
    a receiver coupled to the fourth port,
    said circulator being controllable to direct signal power output of said transmitter to either of said antenna ports and for directing energy returned from either antenna port to the fourth port,
    said circulator being operable to direct any energy returned by the receiver port to that one of the two antenna ports other than the one that delivered that energy to the receiver port,
    a waveguide section having a flange at each end, in series with said receiver port and including a ferrite limiter,
    a varactor limiter supported at the receiver end of the ferrite limiter,
    a ferrite-isolator supported in the waveguide parallel to the ferrite limiter and substantially coextensive therewith, and
    magnetic bias means for said ferrite limiter and said ferrite isolator supported by the exterior of said waveguide section between the flanges.

* * * * *